(12) United States Patent
Campbell et al.

(10) Patent No.: US 7,126,619 B2
(45) Date of Patent: Oct. 24, 2006

(54) SYSTEM AND METHOD FOR DIRECT LASER ENGRAVING OF IMAGES ONTO A PRINTING SUBSTRATE

(75) Inventors: Jeffrey G. Campbell, Rutland, VT (US); Leo Beiser, Flushing, NY (US)

(73) Assignee: Buzz Sales Company, Inc., Crystal Lake, IL (US)

( * ) Notice: Subject to any disclaimer, the term of this patent is extended or adjusted under 35 U.S.C. 154(b) by 473 days.

(21) Appl. No.: 10/159,492

(22) Filed: May 31, 2002

(65) Prior Publication Data

US 2003/0221570 A1   Dec. 4, 2003

(51) Int. Cl.
  *B41J 2/435*   (2006.01)
  *B41J 2/47*   (2006.01)
(52) U.S. Cl. .................... 347/224; 347/225
(58) Field of Classification Search ........... 347/115, 347/224–225, 241–244, 256–261, 230–231; 219/121.6, 121.69, 121.74, 121.75, 121.8; 129/121.68; 359/223, 423, 434
See application file for complete search history.

(56) References Cited

U.S. PATENT DOCUMENTS

| | | | |
|---|---|---|---|
| 3,154,370 A | 10/1964 | Johnson | 347/255 |
| 3,549,733 A | 12/1970 | Caddell | 264/400 |
| 3,647,956 A | 3/1972 | Buck et al. | 348/203 |
| 3,970,359 A | 7/1976 | Starkweather | 359/201 |
| 3,985,953 A | 10/1976 | Dunkley | 358/3.29 |
| 4,266,847 A | 5/1981 | Menke | 359/201 |
| 4,275,143 A | 6/1981 | Sakurai | 430/307 |
| 4,287,537 A | 9/1981 | Pfau et al. | 358/3.3 |
| 4,314,154 A | 2/1982 | Minoura et al. | 250/235 |
| 4,327,287 A | 4/1982 | Saito et al. | 250/234 |
| 4,354,196 A | 10/1982 | Neumann et al. | 347/248 |
| 4,388,865 A | 6/1983 | Kellner | 101/401.1 |
| 4,455,485 A | 6/1984 | Hosaka et al. | 250/234 |
| 4,528,909 A | 7/1985 | Rigg et al. | 101/395 |
| 4,565,771 A | 1/1986 | Lynch et al. | 430/307 |
| 4,886,958 A | 12/1989 | Merryman et al. | 250/492.2 |
| 4,912,487 A | 3/1990 | Porter et al. | 347/255 |
| 4,936,643 A | 6/1990 | Beiser | 359/212 |

(Continued)

FOREIGN PATENT DOCUMENTS

DE  42 09 933 A1  9/1993

(Continued)

*Primary Examiner*—Hai Pham
(74) *Attorney, Agent, or Firm*—Wallenstein & Wagner, Ltd.

(57) ABSTRACT

An optical scanning system and method for laser engraving a plurality of data subrasters into a substrate to form a raster of engraved data defining an image on the substrate. Each subraster has a length dimension and a width dimension. The system includes a transport assembly having an objective lens and a mirror, the mirror capable of reflecting a substantially collimated scanning beam incident thereon in a direction transverse to an axis of the incident beam such that it is directed to the objective lens. The objective lens is capable of focusing the scanning beam on the substrate to engrave a set of data in the width dimension of the subraster and the objective lens and mirror combination is capable of moving along the axis of the incident beam to allow subsequent engraving of other sets of data in the width dimension until a complete subraster is formed along its length dimension. The objective lens and mirror combination is also capable of returning to its starting position to begin engraving of a subsequent subraster of the plurality of subrasters forming the raster of engraved data. A thermoset plastic substrate is also identified as being particularly suitable for use with the aforementioned system and method.

42 Claims, 5 Drawing Sheets

U.S. PATENT DOCUMENTS

| | | | |
|---|---|---|---|
| 4,985,780 A * | 1/1991 | Garnier et al. | 219/121.68 |
| 5,033,806 A | 7/1991 | Tomita et al. | 347/256 |
| 5,109,149 A * | 4/1992 | Leung | 219/121.69 |
| 5,114,217 A | 5/1992 | Beiser | 359/216 |
| 5,201,268 A | 4/1993 | Yamamoto et al. | 101/170 |
| 5,259,311 A | 11/1993 | McCaughey, Jr. | 101/401.1 |
| 5,459,325 A | 10/1995 | Hueton et al. | 250/458.1 |
| 5,557,438 A | 9/1996 | Schwartz et al. | 359/204 |
| 5,635,708 A | 6/1997 | Obata | 250/234 |
| 5,646,765 A | 7/1997 | Laakmann et al. | 359/202 |
| 5,767,887 A * | 6/1998 | Warner et al. | 347/115 |
| 5,982,527 A | 11/1999 | Beiser | 359/216 |
| 6,012,816 A | 1/2000 | Beiser | 353/122 |
| 6,177,648 B1 | 1/2001 | Lawson et al. | 219/121.62 |
| 6,199,990 B1 | 3/2001 | Chee et al. | 359/850 |
| 6,328,448 B1 | 12/2001 | Beiser | 353/70 |

FOREIGN PATENT DOCUMENTS

| | | |
|---|---|---|
| DE | 100 54 638 A1 | 8/2002 |
| GB | 2 034 636 A | 6/1980 |
| GB | 2 071 574 A | 9/1981 |
| GB | 2 087 796 A | 6/1982 |
| WO | WO 02/076738 A1 | 10/2002 |

* cited by examiner

SYSTEM AND METHOD FOR DIRECT LASER ENGRAVING OF IMAGES ONTO A PRINTING SUBSTRATE

TECHNICAL FIELD

This invention relates to direct laser engraving of a flat substrate for use in a printing process, such as intaglio printing. More particularly, the invention relates to an optical scanning system and substrate material particularly suitable for high-speed and high-resolution engraving.

BACKGROUND OF THE INVENTION

Many printing processes utilize substrates, platens or forms as printing surfaces to transfer an image to a printable medium. One such process is called intaglio printing. Intaglio printing involves application of printed indicia or images below the surface of a platen or substrate that is utilized as a printing surface. Traditionally, intaglio substrates have been prepared by mechanically engraving or chemically etching a recessed pattern into the printing surface of the substrate, which defines an image. The pattern may comprise an array of dots in the printing surface of the substrate. The recessed pattern, such as the array of dots, define tiny recesses within which ink is held and transferred to the printable medium, such as a sheet or surface. This intaglio process is typically used in die stamping or in engraved processes, sometimes referred to as copper plate printing. It is also used in connection with pad printing, which is typically used to decorate plastic surfaces, as well as in the gravure printing process.

Mechanical engraving and chemical etching techniques are time-consuming processes. Mechanical techniques are typically slow due to limitations of engraving equipment. A mechanical stylus must be used to engrave the image into the substrate, which requires a certain amount of time to penetrate and cut the substrate material. Furthermore, accuracy of the engraving becomes an issue when the stylus becomes worn and dull. On the other hand, chemical etching is time consuming due to the many steps involved. Chemical etching is a multi-step process that first involves producing the image onto a film negative, such as with an imagesetter. Once the film is produced, it becomes a mask that can be laid on top of a copper or steel substrate having a thin film coating of sensitizing material. The substrate and mask combination is exposed to light for subsequent chemical development, which transfers the mask to the copper plate. After development, the substrate is ready for acid etching to complete the process. Accuracy is also an issue with chemical etching, due to the limited controllability of the chemical-etching process.

Another technique involves direct laser etching, which is a single-step process that requires much less time than mechanical engraving and chemical etching techniques. In this technique, a laser is used to directly engrave the substrate material. However, because metals have a high reflectance, the laser/metal interaction is not conducive to producing plates having sharp engravings. With metals and a majority of plastics, direct laser engraving causes the material to melt, which creates the recessed areas, but also creates pooling of melted material around these recessed areas. This pooling of material acts as a ridge surrounding the recessed areas, which adversely affects the accuracy and usefulness of the printing surface of the substrate. Thus, accuracy remains an issue. Furthermore, although the direct laser technique is only a single-step process, the speed of the engraving process still remains an issue at higher resolution levels, which require the laser to engrave a higher number of tightly focused dots to achieve such resolutions. With presently known systems, the engraving process time is increased when the resolution level is increased.

The system and method of the present invention addresses these and other problems associated with direct laser engraving of substrates.

SUMMARY OF THE INVENTION

An optical scanning system for laser engraving a plurality of data subrasters into a substrate to form a raster of engraved data defining an image on the substrate. Each subraster has a length dimension and a width dimension. The system includes a transport assembly having an objective lens and a mirror, the mirror capable of reflecting a substantially collimated scanning beam incident thereon in a direction transverse to an axis of the incident beam such that it is directed to the objective lens. The objective lens is capable of focusing the scanning beam on the substrate to engrave a set of data in the width dimension of the subraster and the objective lens and mirror combination is capable of moving along the axis of the incident beam to allow subsequent engraving of other sets of data in the width dimension until a complete subraster is formed along its length dimension. The objective lens and mirror combination is also capable of returning to its starting position to begin engraving of a subsequent subraster of the plurality of subrasters forming the raster of engraved data.

In a particular embodiment, an optical scanning system for laser engraving of a plurality of subrasters of data into a substrate to form a raster of engraved data is provided and includes a scanner capable of deflecting an input laser beam incident thereon from a first beam direction to create a scanning beam. The system also includes a beam expander capable of receiving the scanning beam and expanding it to create an expanded scanning beam. A transport assembly of the system has an objective lens and a mirror, wherein the mirror is capable of reflecting the expanded scanning beam in a second beam direction transverse to the first beam direction such that it is incident on the objective lens. The objective lens and mirror is capable of moving along an axis defined by the first beam direction. The objective lens is capable of focusing the expanded scanning beam on the substrate to engrave a set of data oriented in a width dimension of the subraster and is also capable of moving along the first beam axis to allow subsequent engraving of other sets of data oriented in the width dimension until a complete subraster is formed to define a length dimension of the subraster. The objective lens and mirror combination is further capable of returning to its starting position to initiate engraving of a subsequent subraster.

According to another aspect of the invention, an optical scanning system is provided that is capable of engraving at two different resolutions.

According to another aspect of the invention, a substrate is provided for use with a direct laser engraving process to create an intaglio printing substrate. The substrate consists essentially of a thermoset plastic which substantially vaporizes in response to an impinging laser beam that engraves portions of the substrate, thereby substantially eliminating the formation of slag material adjacent to engraved portions of the substrate.

According to yet another aspect of the invention, a method of laser engraving a substrate for use in a printing process is provided. The method comprises the steps of: (a)

directing a substantially collimated scanning beam having a beam axis to an objective lens that is movable along the beam axis, wherein the scanning beam defines a scan width; (b) focusing the scanning beam through the objective lens and onto the substrate; (c) engraving onto the substrate a set of subraster width data having a width equal to the scan width of the beam; (d) continuously moving the objective lens along the beam axis to subsequent positions relative to the substrate and engraving subsequent sets of subraster width data to form a complete subraster; (e) incrementing the substrate and engraving an additional subraster adjacent to the previously completed subraster; and (f) repeating the steps of incrementing the substrate and engraving an additional subraster until a complete raster made up of a plurality of subrasters is created that defines an engraved image on the substrate.

These and other aspects of the invention will become apparent from the specification, drawings and claims.

DETAILED DESCRIPTION OF THE PREFERRED EMBODIMENTS

Figure 1:
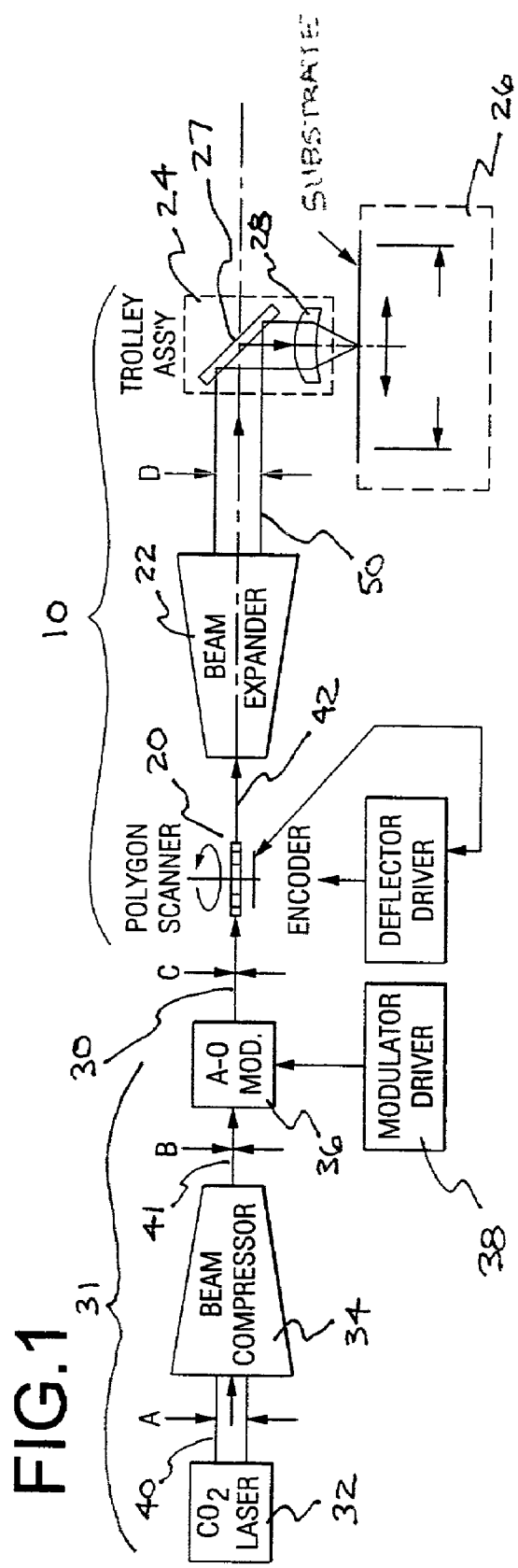
FIG. 1 is a schematic diagram of an embodiment of a direct laser engraving system in accordance with the present invention.

While this invention is susceptible of embodiments in many different forms, there is shown in the drawings and will herein be described in detail one or more preferred embodiments of the invention with the understanding that the present disclosure is to be considered as an exemplification of the principles of the invention and is not intended to limit the broad aspect of the invention to the embodiments illustrated.

FIG. 1 depicts a schematic diagram of an embodiment of an optical scanning system 10 in accordance with the principles of the present invention. The system 10 can be utilized for laser engraving a substrate for use in a printing process. A particular feature of the system 10 is the ability to engrave at two different resolutions with the same optical system. In a preferred embodiment, the system 10 is capable of engraving at 1200 dpi and 2400 dpi. Referring to FIG. 1, the system 10 includes a polygon scanner 20, a beam expander 22 and a transport (or trolley) assembly 24. A receptor assembly 26 is disposed adjacent to the transport assembly 24 and supports the substrate to be engraved. The receptor assembly 26 is capable of incrementally translating the substrate with respect to the transport assembly 24 via a stepped transport. As will be discussed in more detail below, the transport assembly 24 includes a mirror 27 and an objective lens 28 that are also movable to facilitate the engraving process.

The system 10 requires an input beam 30. A laser assembly 31 is provided to produce the input beam 30, which is incident on the scanner 20 from a first beam direction. The laser assembly 31 includes a laser 32 (preferably a DC excited $CO_2$ laser), a beam compressor 34 and a modulator 36 driven by a modulator driver 38. Referring to FIG. 1, the laser 32 produces a beam 40 (having a beam width A) that is shaped by the beam compressor 34 to produce a compressed beam 41 (having a beam width B). The compressed beam 41 is modulated by the modulator 36 to produce the input beam 30 (having a beam width C). Preferably, the beam width A of the beam 40 is 8 mm, the beam width B of the compressed beam 41 is 1 mm, and the beam width C of the input beam is 1 mm. The input beam 30 is scanned by the scanner 20 to produce a scanning beam 42, which is directed to the beam expander 22. As will be explained in more detail below, the beam expander 22 produces a substantially collimated expanded scanning beam 50 (having a beam width D), which is directed to the mirror 27 and objective lens 28 combination of the transport assembly 24. The mirror 27 reflects the beam 50 to the objective lens 28, which focuses the beam onto the substrate. Preferably, the beam width D of the expanded scanning beam 50 is 20 mm and the mirror 27 is angled at 45 degrees. Essentially, the beam expander 22 expands the scanning beam 42 and relays it to create the expanded scanning beam 50, which has a substantially constant width over an extended distance.

Figure 2:
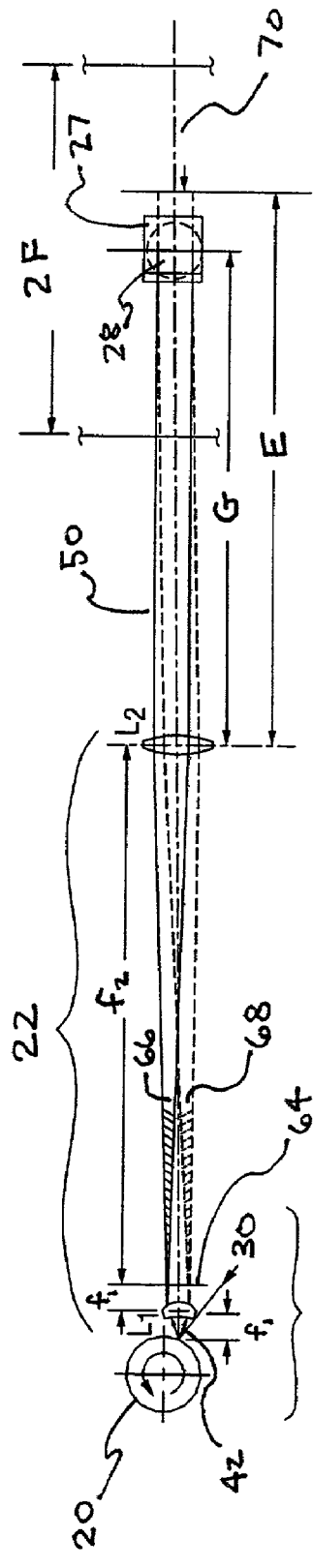
FIG. 2 is a top plan view of a portion of the system of FIG. 1.
Figure 3:
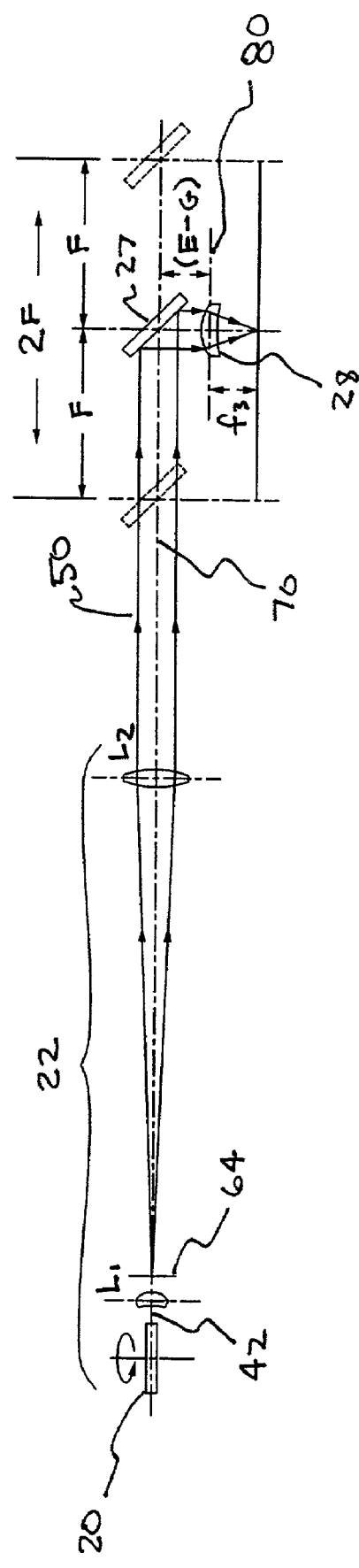
FIG. 3 is a side elevational view of the portion of the system shown in FIG. 2
Figure 4:
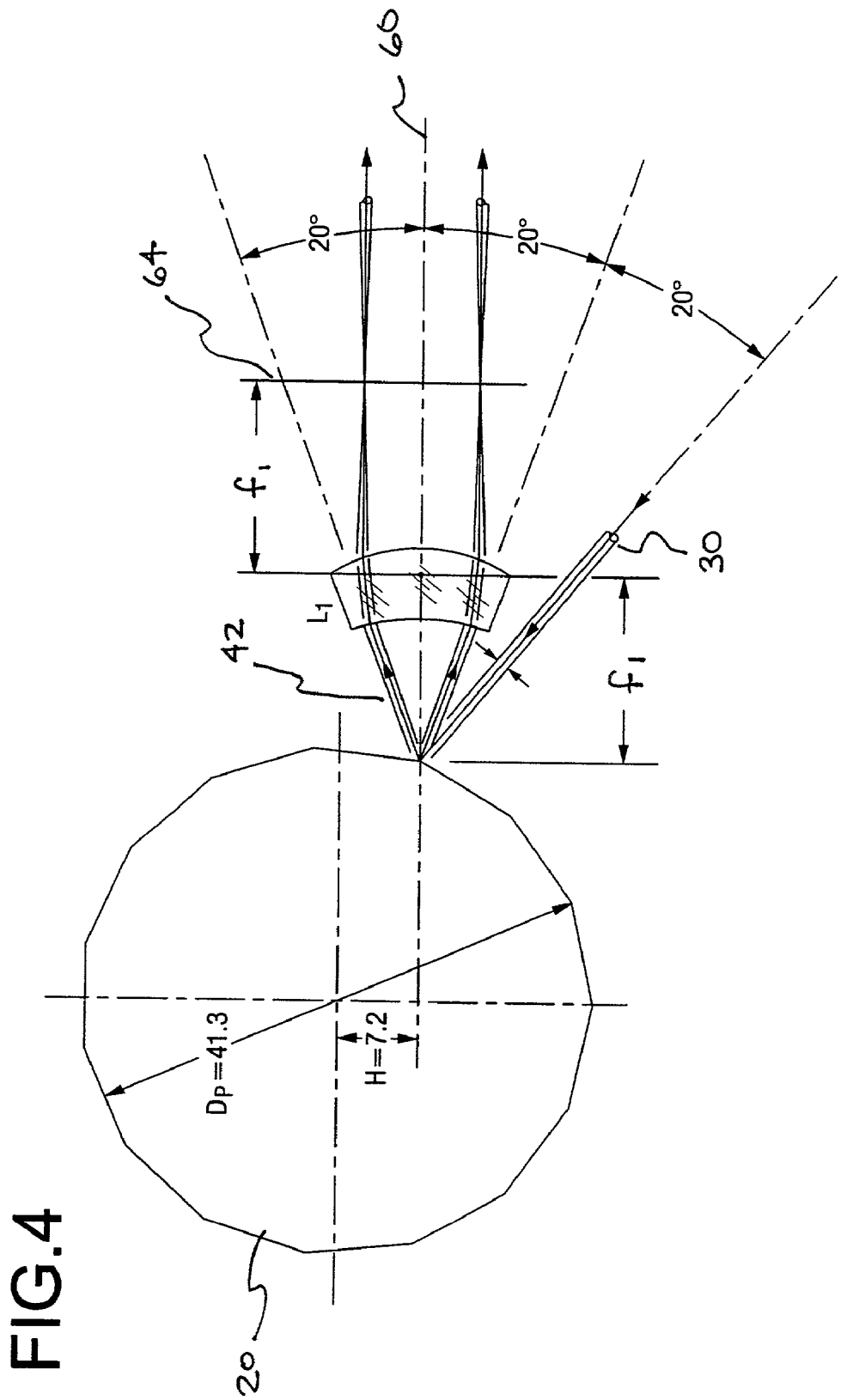
FIG. 4 is a detailed top plan view of the scanner and first lens of the beam expander shown in FIG. 2.

FIGS. 2 and 3 depict the system 10 in more detail. FIG. 2 is a top plan view of the system 10 and FIG. 3 is a side view of FIG. 2. In a preferred embodiment, the scanner 20 is a polygon scanner having 15 facets and is rotatable in a direction indicated by rotational arrows in FIGS. 2 and 3. In a preferred embodiment, the scanner rotates at either 10,000 rpm or 20,000 rpm, depending on desired resolution. Considering the scanner 20 as a nutating mirror executing ±10° mechanical deflection of the input beam 30, the input beam 30 is deflected ±20° due to mirror doubling to produce the scanning beam 42. As shown in FIGS. 2 and 3, the beam expander 22 includes a first lens L1 and a second lens L2. Referring to the detailed view of the scanner 20 and the first lens L1 of the beam expander 22 in FIG. 4, the scanning beam 42, which is a substantially collimated beam having a beam width C and deflected ±20°, is directed to be incident on lens L1. In a preferred embodiment, lens L1 has a focal length of 15 mm. The lens L1 is located one focal length f1 from the scanner surface and acts telecentrically such that the ±20° beams continue to the right of the lens L1 and remain substantially parallel to a lens axis 60, while deflected components of the beams converge to a focal plane 64 one focal length f1 beyond the lens L1. Referring to FIG. 2, beyond the focal plane 64, an upper limit beam 66 and a lower limit beam 68 of the deflected beam components expand. Referring to FIG. 3, the focal plane 64 acts as a plane of beam symmetry, as shown in FIG. 3.

The upper limit beam 66 and the lower limit beam 68 expand until they reach a second lens L2, which is spaced a focal length f2 from the focal plane 64 of the first lens L1. In a preferred embodiment, the focal length f2 is 300 mm. Utilizing the preferred pair of lenses L1 (15 mm focal length) and L2 (300 mm focal length), the beam expander 22 acts as a 20×beam expander ($^{300}/_{15}$=20). Thus, the beam expander 22 in the preferred embodiment expands the 1 mm input beam to a substantially collimated 20 mm output beam. A fundamental consequence of beam expansion is a complimentary compression of scan angle of the beam (in the preferred embodiment, compression from ±20° to ±1°). This reduction in scan angle imparts a practical field angle to the objective lens 28.

Another consequence of this configuration in the preferred embodiment is the relaying of a 1 mm beam aperture at the scanner 20 to a 20 mm beam aperture at the 300 mm focal distance of lens L2. Thus, as shown in FIG. 2, although the beams shift laterally (due to deflection) in the long region between the scanner 20 and the objective lens 28, the beam shift reduces to zero at a distance E beyond lens L2 (300 mm in a preferred embodiment). In other words, the stability of the 1 mm beam at the scanner 20 (scanning beam 42) is transferred as a stable 20 mm beam (expanded scanning beam 50) at the objective lens 28. As explained in more detail below, in a preferred embodiment, the 300 mm distance is a nominal beam travel length for the objective lens 28 with respect to its movement on the transport assembly 24 along a beam axis 70 of the expanded scanning beam 50.

Referring again to FIGS. 2 and 3, the transport assembly 24 facilitates movement of the mirror 27 and the objective lens 28 along the beam axis 70 of the expanded beam 50. The mirror 27 and the objective lens 28 combination are movable within the transport assembly 24 in both directions for a distance F along the beam axis from the nominal position, for a total travel of 2F. In a preferred embodiment, the transport assembly 24 facilitates movement of the mirror 27 and the objective lens 28 for 4 inches (F=4 inches) in each direction for a total range of travel of 8 inches (2F), which corresponds to a dimension of an image format size, which is 8"×10" in a preferred embodiment. Of course, other format sizes could be accommodated through adjustment of the system in accordance with the principles of the present invention.

Referring to FIG. 3, the expanded scanning beam 50 is intercepted by the mirror 27 and reflected, thereby folding the beam 50 so that it is incident on a principal plane 80 of the objective lens 28. The beam 50 is intercepted by the mirror 27 at a nominal position of G, folding the remaining length (E–G) to complete the nominal distance E (300 mm in a preferred embodiment) to the principal plane 80 of the objective lens 28. At the objective lens 28, the beam width of beam 50 (20 mm in a preferred embodiment) is converged over a focal distance (f3) of the lens 28 to an energetic focal point to engrave the surface of the substrate material. The transport assembly 24 transports the mirror 27 and the objective lens 28 over a dimension of the format size (2F). For simplicity of illustration, the limit positions of the mirror 27 and the objective lens 28 are represented in FIG. 3 by the two mirrors shown in phantom lines. It is understood that the mirror 27 and the objective lens 28 move in combination.

Referring to the right side of FIG. 2, it is noteworthy that with a collimated beam incident on the objective lens 28, even though the beam position in the aperture of the lens 28 shifts slightly during transport, the fundamental criterion for accurate placement of the engraving focal point, which is the angle of the collimated beam with respect to the lens axis, remains a constant of the system. As explained below, this establishes uniformity of a width dimension of each of a plurality of subrasters of data engraved to form, in combination, an engraved image.

Figure 5:
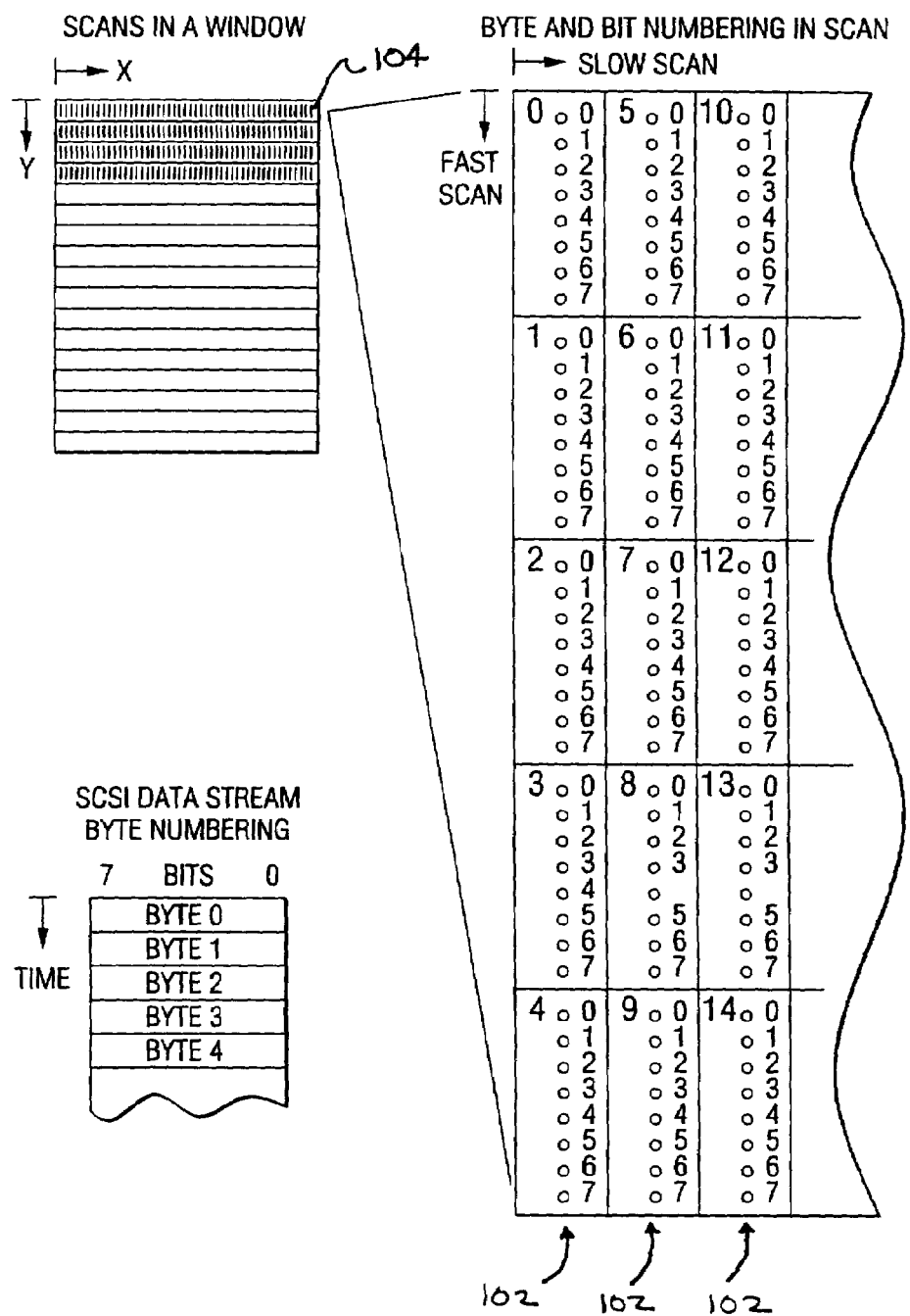
FIG. 5 is a schematic diagram of a byte and bit layout of a sampling of data sets of a subraster in a sample 1200 dpi scan in accordance with the principles of the present invention.

The present invention utilizes a method of engraving the substrate wherein a plurality of data subrasters are engraved to form individual swaths, which, in combination form a complete raster of data representing an image to be engraved. Referring to the schematic diagram of FIG. 5, a byte and bit layout of a sampling of data sets 102 of a subraster in a sample 1200 dpi scan is shown in accordance with the principles of the present invention. Each data bit of the data sets 102 represents a point, or dot, of the image to be engraved. As shown in FIG. 5, each subraster 104 comprises a plurality of data sets in a width dimension of the subraster. In the 1200 dpi resolution example, each data set 102 comprises 40 dots across the width dimension of the subraster (5 sets of 8 dots). In a 2400 dpi example (not shown), each data set comprises 80 dots across the width dimension of the subraster (10 sets of 8 dots). The expanded scanning beam 50 engraves each data set across the subraster width as the transport assembly 24 moves the mirror 27 and objective lens 28 combination in a direction along the length dimension of the subraster 104 (denoted by X in FIG. 5) until the subraster 104 is completed. The objective lens and mirror combination returns to its starting position and the receptor assembly 26 incrementally translates the substrate in a direction along the width dimension of the subraster 104 (denoted by Y in FIG. 5) to initiate engraving of a subsequent subraster. The translation increment is equal to the width dimension of the subraster 104. In a preferred embodiment, the width dimension of each subraster is about 33.3 mils and a total of 300 subrasters are utilized to form the raster. Although the movement of the objective lens and mirror combination is described herein in various phases or steps of the engraving process, it is understood that movement of these components is continuous throughout the engraving process. Table 1 below shows the data point content for both 1200 dpi and 2400 dpi images in an 8"×10" image format.

TABLE 1

Operational Data Point Content for 8" × 10" Image Format

| | Each Data Subraster | | | |
|---|---|---|---|---|
| Resolution | Data Points | Data Sets | Total Data Points Per Subraster | Total Data Points 300 Subrasters |
| 1200 dpi | 40 | 9,600 | 384,000 | 115,200,000 |
| 2400 dpi | 80 | 19,200 | 1,536,00 | 460,800,000 |

During engraving, the laser 32 remains on. Instead of turning the laser 32 on and off, the modulator 36 shifts the beam 30 to a position analogous to ON. An unshifted beam position is analogous to OFF. During engraving, this shift happens at a very high rate. In the OFF position, the beam 30 exits the modulator 36, strikes a dump mirror (not shown), and deflects into a beam dump (not shown) to absorb unwanted laser power. When the modulator 36 shifts the beam 30 in an ON position, the shifted beam 30 bypasses the dump mirror and impinges on the scanner 20. Based on these ON and OFF positions, each data point or dot can represent an engraved point (ON) or an unengraved point (OFF) on the surface of the substrate.

Figure 6:
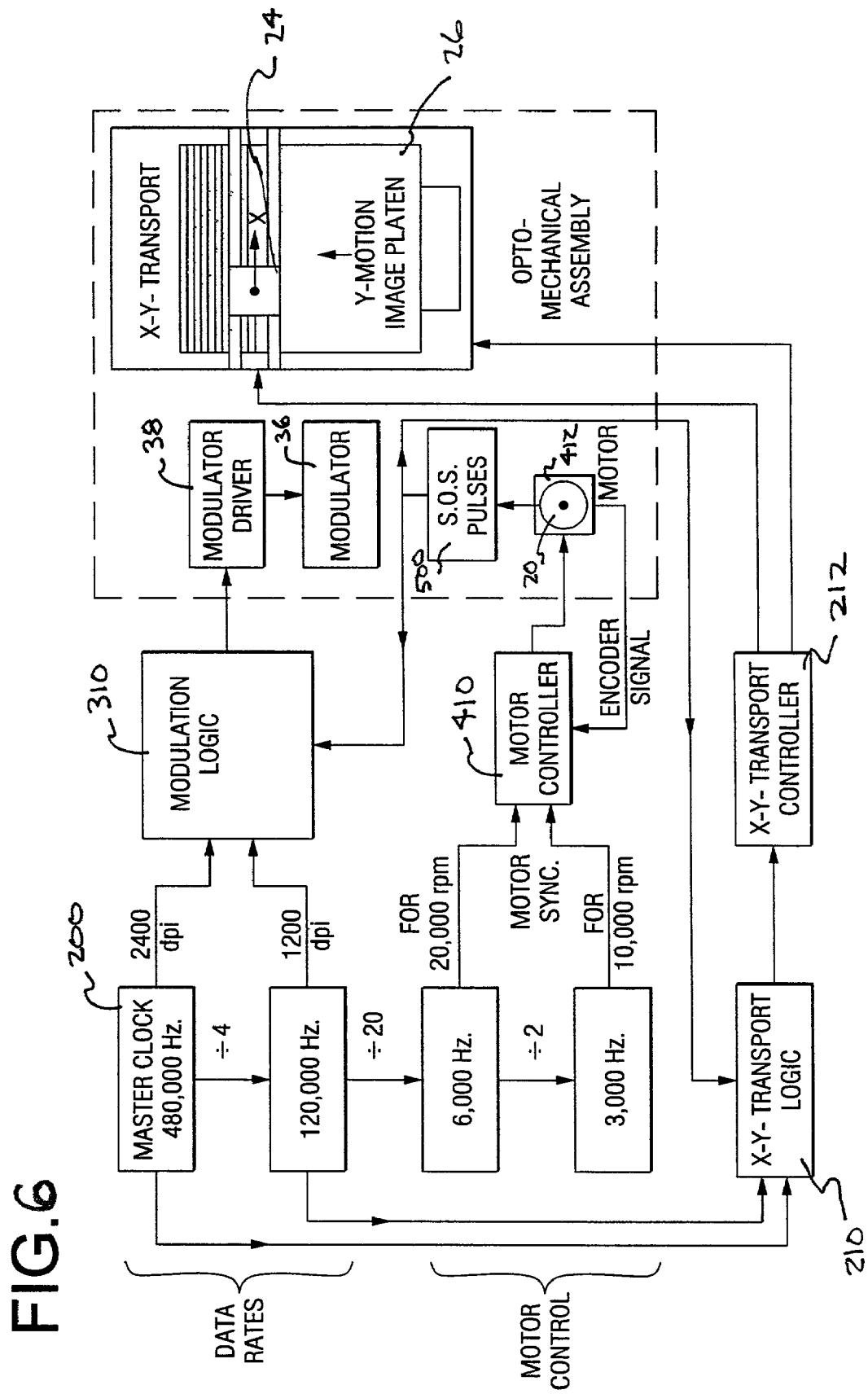
FIG. 6 is a functional block diagram of data handling of the system of FIG. 1.

FIG. 6 depicts a functional block diagram of data handling of the system. As shown in FIG. 6, a master clock 200 operates at 480 kHz, which is the data rate for 2400 dpi resolution. The master clock 200 is stepped down to 120 kHz for 1200 dpi resolution. The data rate clocks clock an X–Y transport logic 210, which in turn drives an X–Y transport controller 212 for the transport assembly 24 (which moves the mirror 27 and objective lens 28 in the X-direction) and the receptor assembly 26 (which incrementally translates the substrate in the Y-direction). The data rate clocks also clock a modulation logic 310, which in turn operates the modulator driver 38 that drives the modulator 36. The master clock 200 is stepped down further to provide a motor control, as shown in FIG. 6. The scanner 20 rotates at either 10,000 rpm (1200 dpi) or 20,000 rpm (2400 dpi). A motor controller 410 is clocked at 6 kHz for 20,000 rpm and 3 kHz for 10,000 rpm to control a motor 412 that drives the scanner 20. An encoder signal is provided back to the motor controller from the scanner 20. S.O.S (Start of Scan) pulses from the scanner 20 and are fed to the modulation logic 310 and and the X–Y transport logic 210. Each S.O.S. pulse initiates the first data point of each data set in the width dimension of the subrasters. Each S.O.S pulse also triggers the modulation sequence for each data set.

As already mentioned, a particular advantage of the system 10 is its ability to provide two different resolutions with the same optical system (1200 dpi and 2400 dpi in a preferred embodiment). This is accomplished by narrowing the modulation pulse width at 2400 dpi to half of the modulation pulse width at 1200 dpi, while doubling its repetition rate, which doubles the dot count along the subraster width from 40 to 80. Correspondingly, the motor speed of the scanner is doubled from 10,000 rpm to 20,000 rpm, which provides a full double-resolution dot array (data set) across the width dimension of the subraster. The modulation pulse width is narrowed by reducing the intensity of the beam. Since the dots are formed by a Gaussian focused beam contour, reducing the pulse duration by one half reduces the dot exposure (intensity) on the substrate, which, in turn, sufficiently reduces the dot width to facilitate the double-resolution engraving. The repetition rate of the modulation pulse width is changed via software control. Since the exposure (intensity) is reduced at the 2400 dpi resolution, the total energy remains the same as that at 1200 dpi resolution. Since the total energy is the same, the total engraving duration is the same. Thus, the system is capable of doubling its engraving resolution without increasing engraving time.

From the foregoing description, it is apparent that changing the resolution of the system is rapidly accomplished without the need for critical mechanical changes, such as changing the objective lens to focus to a smaller dot size, which can be very costly. Furthermore, two different resolutions can be engraved with the same optical system, which creates the same subraster format to cover the same total area during the same total time, and the same laser providing the same optical power.

As yet another aspect of the present invention, it has been found that the use of a thermoset plastic material as the substrate substantially eliminates unwanted slag formation around the engraved points of the substrate. The thermoset plastic material substantially vaporizes in response to the impinging laser beam that engraves points of the substrate, thereby substantially eliminating the formation of the slag material. Desirable results have been achieved by including a mineral filler with the thermoset material. Preferably, the mineral filler has a grain size smaller than a smallest feature of the engraved portions of the substrate. Preferably, the grain size is in the range of about 3 to 5 microns. However, the grain size can be varied to match a particular resolution. The filler adds strength to the substrate material, thereby maintaining the accuracy and detail of the engraved portions of the substrate. In a preferred embodiment, silica is utilized as a filler for the thermoset material. Additionally, a flame retardant can be included to minimize flame and smoke formation from the impinging laser beam.

Thermoset plastics provide for more accurate laser engraving due, in part, to their strength and resistance to flow. The polymer component consists of molecules with permanent cross-links between linear chains that form a rigid three-dimensional network structure which cannot flow. The tightly cross-linked structure of thermosetting polymers immobilizes the molecules, providing hardness, strength at relatively high temperature, insolubility, good heat and chemical resistance, and resistance to creep. The use of a thermoset plastic material for a substrate has a significant impact on the cost of printing processes that utilize such substrates. Thermoset plastic substrates are much less expensive than copper or steel substrates and they do not sacrifice engraving accuracy, and hence, printing accuracy.

It is contemplated that a variety of thermoset plastic materials can be utilized in accordance with the principles of the present invention. Such materials include epoxies, unsaturated polyesters, phenolics, amino resins (such as urea- and melamine-formaldehyde), alkyds, allyl family (such as diallyphthalate), silicone molding compunds, and polyimides (such as bimaleimides).

It is understood that, given the above description of the embodiments of the invention, various modifications may be made by one skilled in the art. Such modifications are intended to be encompassed by the claims below.

What is claimed is:

1. An optical scanning system for laser engraving of a plurality of subrasters of data into a substrate to form a raster of engraved data, each subraster having a length dimension and a width dimension, the system comprising:
   a scanner capable of deflecting an input laser beam incident thereon from a first beam direction to create a scanning beam in a second direction, centered about a second axis;
   a beam expander centered on the second axis capable of receiving the scanning beam and forming it as an expanded and relayed scanning beam centered about the second axis; and
   a transport assembly having an objective lens and a mirror, the mirror capable of reflecting the expanded scanning beam in a third beam direction transverse to the second beam direction transverse to the first beam direction such that it is incident on the objective lens, the objective lens and mirror capable of moving along an axis defined by the first beam direction;
   wherein the objective lens is capable of focusing the expanded scanning beam on the substrate to engrave a set of data oriented in the width dimension of the subraster;
   wherein the objective lens and mirror combination is capable of moving along the first beam axis to allow subsequent engraving of other sets of data oriented in the width dimension until a complete subraster is formed to define the length dimension; and
   wherein the objective lens and mirror combination is capable of returning to its starting position to initiate engraving of a subsequent subraster.

2. The system of claim 1, further including a receptor assembly disposed substantially parallel to the objective lens of the transport assembly and capable of supporting the substrate and translating it relative to the transport assembly along the width dimension of the subraster.

3. The system of claim 1, wherein the scanner and the beam expander are in a fixed position relative to the substrate during engraving of a subraster.

4. The system of claim 1, wherein the beam expander reduces a scanned angle of the input beam when the input beam is expanded.

5. The system of claim 1, wherein the scanner is positioned a distance away from the movable objective lens, and the system simulates an effect of the scanner being positioned at the movable objective lens.

6. The system of claim 1, wherein the scanning beam has a scan angle of about ±20° and the expanded scanning beam has a scan angle of about ±1°.

7. The system of claim 1, wherein each set of data oriented in the width dimension comprises a set of dots, each dot representing one of either an engraved point or a unengraved point on the substrate.

8. The system of claim 1, wherein each set of data in the width dimension comprises 40 dots, each dot representing one of either an engraved point or a unengraved point on the substrate across the width dimension.

9. The system of claim 1, wherein each set of data in the width dimension comprises 80 dots, each dot representing one of either an engraved point or an unengraved point on the substrate across the width dimension.

10. The system of claim 1, wherein the raster of engraved data has a resolution of 1200 dpi.

11. The system of claim 1, wherein the raster of engraved data has a resolution of 2400 dpi.

12. The system of claim 1, wherein the width dimension of the subrasters is about 33 mils.

13. The system of claim 1, wherein the beam expander comprises a first lens having a first focal length, and a second lens having a second focal length which is spaced a distance of the second focal length from the focal point of the first lens, wherein a scanner deflection point is located a first focal length ahead of the first lens, and the objective lens is positioned a second focal length beyond the second lens at the center of travel, thereby relaying an image of the scanner into the objective lens.

14. The system of claim 13, wherein the first focal length is about 15 mm and the second focal length is about 300 mm.

15. An optical scanning system for laser engraving of a plurality of subrasters of data into a substrate to form a raster of engraved data, each subraster having a length dimension and a width dimension that is substantially less than the length dimension, the system comprising:
  a polygon scanner capable of deflecting an input laser beam incident thereon from a first beam direction to create a scanning beam in a second direction, centered about a second axis;
  a beam expander centered on the second axis capable of receiving the scanned beam and forming it as an expanded and relayed scanning beam centered about the second axis;
  a transport assembly having an objective lens and a mirror, the mirror capable of reflecting the expanded scanning beam in a third beam direction transverse to the second beam direction transverse to the first beam direction such that it is incident on the objective lens, the objective lens and mirror being movable in a direction along the length dimension of the subraster; and
  a receptor assembly disposed substantially parallel to the objective lens of the transport assembly and capable of supporting the substrate and translating it relative to the transport assembly in the direction along the width dimension of the subraster;
  wherein the objective lens focuses the expanded scanning beam on the substrate to engrave a set of data in the width dimension of the subraster;
  wherein the objective lens and mirror combination moves in the direction along the length dimension of the subraster to allow subsequent engraving of other sets of data in the width direction until a complete subraster is formed; and
  wherein the objective lens and mirror combination returns to its starting position and the substrate is translated to initiate engraving of a subsequent subraster.

16. The system of claim 15, wherein the scanner and the beam expander are in a fixed position relative to the substrate during engraving of a subraster.

17. The system of claim 15, wherein the beam expander reduces a scanned angle of the input beam when the input beam is expanded to maintain a substantially collimated beam.

18. The system of claim 15, wherein the scanner is positioned a distance away from the movable objective lens, and the system simulates an effect of the scanner being positioned at the movable objective lens.

19. The system of claim 15, wherein the scanning beam has a scan angle of about ±20° and the expanded scanning beam has a scan angle of about ±1°.

20. The system of claim 15, wherein each set of data oriented in the width dimension comprises a set of dots, each dot representing one of either an engraved point or a unengraved point on the substrate.

21. The system of claim 15, wherein each set of data in the width dimension comprises 40 dots, each dot representing one of either an engraved point or an unengraved point on the substrate across the width dimension.

22. The system of claim 21, wherein the 40 dots across the width dimension is made up of 5 subsets of 8 dots, each dot representing a data bit and each subset representing a data byte.

23. The system of claim 15, wherein each set of data in the width dimension comprises 80 dots, each dot representing one of either an engraved point or an unengraved point on the substrate across the width dimension.

24. The system of claim 23, wherein the 80 dots across the width dimension is made up of 10 subsets of 8 dots, each dot representing a data bit and each subset representing a data byte.

25. The system of claim 15, wherein the raster of engraved data has a resolution of 1200 dpi.

26. The system of claim 15, wherein the raster of engraved data has a resolution of 2400 dpi.

27. The system of claim 15, wherein the beam expander comprises a first lens having a first focal length, and a second lens having a second focal length which is spaced a distance of the second focal length from the focal point of the first lens, wherein a scanner deflection point is located a first focal length ahead of the first lens, and the objective lens is positioned a second focal length beyond the second lens at the center of travel, thereby relaying an image of the scanner into the objective lens.

28. The system of claim 27, wherein the first focal length is about 15 mm and the second focal length is about 300 mm.

29. The system of claim 28, wherein the movable objective lens and mirror combination is movable within a range of 8 inches along the first beam direction, the 8 inch range corresponding to the length dimension of the subrasters.

30. The system of claim 29, wherein the objective lens and mirror combination is nominally positioned about 270 mm from the second lens of the beam expander and movable about 4 inches therefrom along the first beam direction.

31. The system of claim 15, wherein the width dimension of the subrasters is about 33 mils.

32. An optical scanning system for laser engraving a plurality of data subrasters into a substrate to form a raster of engraved data defining an image on the substrate, each subraster having a length dimension and a width dimension that is substantially less than the length dimension, the system including a polygon scanner capable of engraving at two different resolutions by changing the speed of the polygon scanner, the system including a transport assembly having an objective lens and a mirror, the mirror capable of reflecting a substantially collimated scanning beam incident thereon in a direction transverse to an axis of the incident beam such that it is directed to the objective lens; wherein the objective lens is capable of focusing the scanning beam on the substrate to engrave a set of data in the width dimension of the subraster; wherein the objective lens and mirror combination is capable of moving along the axis of the incident beam to allow subsequent engraving of other sets of data in the width dimension until a complete subraster is formed along its length dimension; and wherein the objective lens and mirror combination is capable of returning to its starting position to begin engraving of a subsequent subraster of the plurality of subrasters forming the raster of engraved data.

33. The system of claim 32, wherein each set of data oriented in the width dimension comprises a set of dots, each dot representing one of either an engraved point or a unengraved point on the substrate.

34. The system of claim 32, wherein each set of data in the width dimension comprises 40 dots, each dot representing one of either an engraved point or an unengraved point on the substrate.

35. The system of claim 32, wherein each set of data in the width dimension comprises 80 dots, each dot representing one of either an engraved point or an unengraved point on the substrate.

36. The system of claim 32, wherein the raster of engraved data has a resolution of 1200 dpi.

37. The system of claim 32, wherein the raster of engraved data has a resolution of 2400 dpi.

38. The system of claim 32, wherein the width dimension of the subrasters is about 33 mils.

39. An optical scanning system for laser engraving of a plurality of data subrasters into a substrate to form a raster of engraved data, each subraster having a length dimension and a width dimension, the system including a polygon scanner capable of engraving at two different resolutions by changing the speed of the polygon scanner, the system including a transport assembly having an objective lens and a mirror, the objective lens disposed parallel to the substrate, the mirror capable of reflecting a substantially collimated scanning beam incident thereon from a first direction in a second direction transverse to the first direction such that the scanning beam is incident on the objective lens, wherein the objective lens is capable of focusing the scanning beam on the substrate to engrave a set of data oriented in the width dimension of the subraster; wherein the objective lens and mirror combination is capable of moving in the direction along the length dimension of the subraster to allow subsequent engraving of other sets of data oriented in the width dimension until a complete subraster is formed; and wherein the objective lens and mirror combination is capable of returning to its starting position to begin engraving of a subsequent subraster.

40. The system of claim 39, wherein each set of data oriented in the width dimension comprises a set of dots, each dot representing one of either an engraved point or an unengraved point on the substrate.

41. The system of claim 40, wherein each set of data in the width dimension comprises 40 dots.

42. The system of claim 40, wherein each set of data in the width dimension comprises 80 dots.

* * * * *